United States Patent [19]

Bartha et al.

[11] Patent Number: 5,960,255
[45] Date of Patent: Sep. 28, 1999

[54] CALIBRATION STANDARD FOR 2-D AND 3-D PROFILOMETRY IN THE SUB-NANOMETER RANGE AND METHOD OF PRODUCING IT

[75] Inventors: Johann W. Bartha, Aidlingen; Thomas Bayer, Sindelfingen; Johann Greschner, Pliezhausen; Martin Nonnenmacher, deceased, late of Schoenaich, by Regine Nonnenmacher, legal representative; Helga Weiss, Boeblingen, all of Germany

[73] Assignee: International Business Machines Corporation, Armonk, N.Y.

[21] Appl. No.: 08/842,307

[22] Filed: Apr. 24, 1997

Related U.S. Application Data

[62] Division of application No. 08/472,100, Jun. 7, 1995, Pat. No. 5,665,905, which is a division of application No. 08/255,209, Jun. 7, 1994, Pat. No. 5,534,359.

[51] Int. Cl.$^6$ .......................... G01R 31/26; H01L 21/66; H01L 21/00; H01L 21/76
[52] U.S. Cl. .............................. 438/14; 438/406; 73/105; 250/307
[58] Field of Search .............................. 73/105; 250/306, 250/307; 438/406, 10, 11, 14, 17, 18

[56] References Cited

U.S. PATENT DOCUMENTS

| | | | |
|---|---|---|---|
| 5,166,100 | 11/1992 | Gossard et al. | 437/228 |
| 5,578,745 | 11/1996 | Bayer et al. | 73/1 |
| 5,677,765 | 10/1997 | Laird et al. | 356/243 |

*Primary Examiner*—Brian Dutton
*Attorney, Agent, or Firm*—Robert M. Trepp

[57] ABSTRACT

A calibration standard comprises a supporting structure (1) of single crystal material with at least one pair of different kinds of structures consisting of a raised line (2) and a trench (3). These structures have the identical width in the range of about 500 nm. The single crystal material preferably is silicon with (110)-orientation. A method of producing the calibration standard comprises the steps: providing two polished wafers of the same single crystal material and with the same crystal orientation, forming an oxide layer on the polished surface of the first wafer, bonding the second wafer to the first oxidized wafer with the polished surfaces of the wafers facing each other, cutting the bonded structure transverse to the polished surfaces, selectively etching both the wafers to a defined depth to expose a portion of the oxide layer, masking the portions of the oxide layer now representing the raised line (2) and selectively etching the oxide layer in the unmasked areas to a defined depth to form the trench (3). The calibration standard overcomes the problem of measuring the diameter of an ultrafine tip for AFM/STM profilometry in the sub-nanometer range.

4 Claims, 5 Drawing Sheets

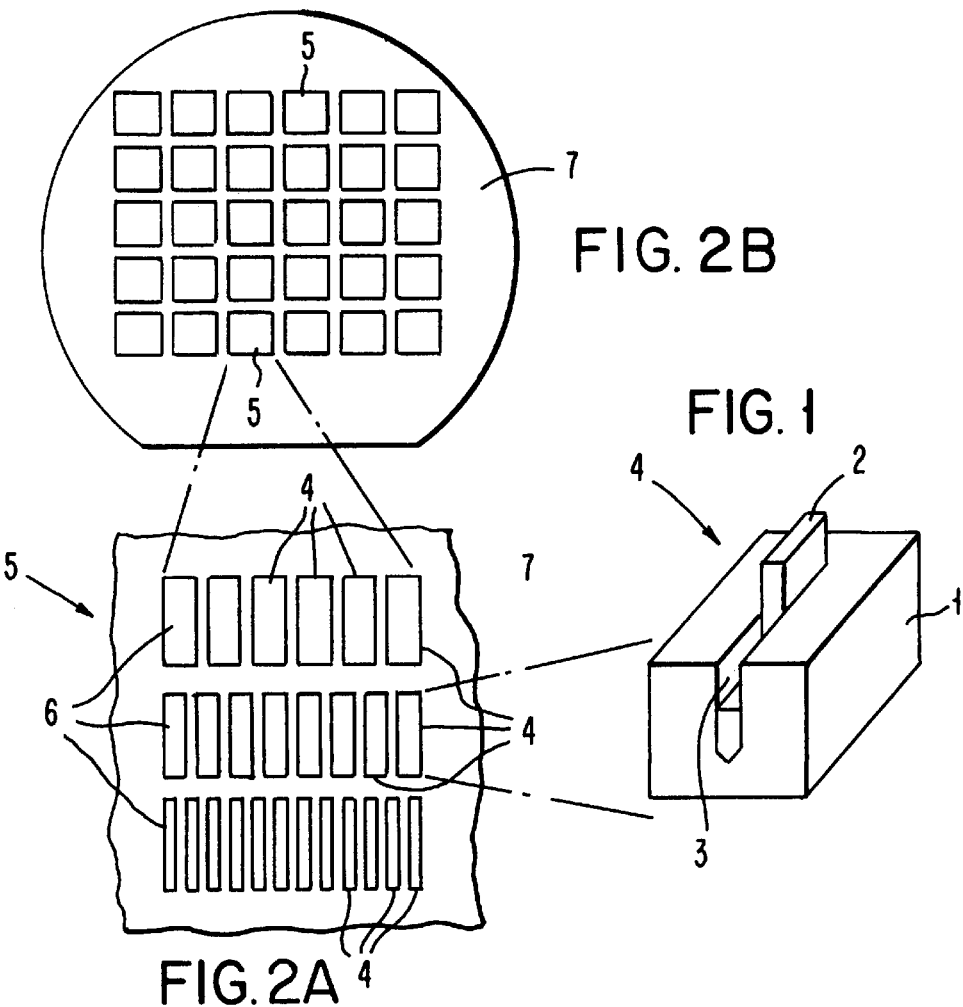
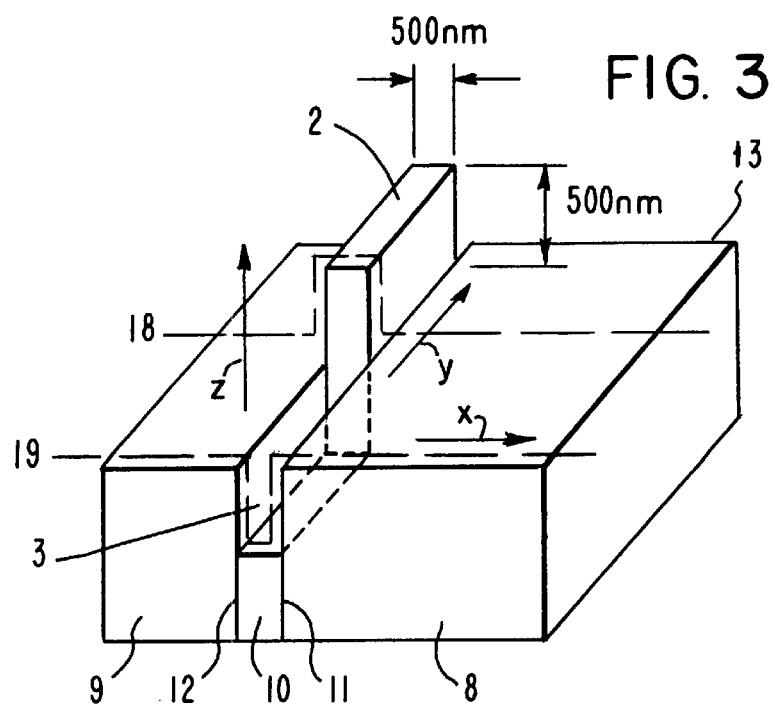

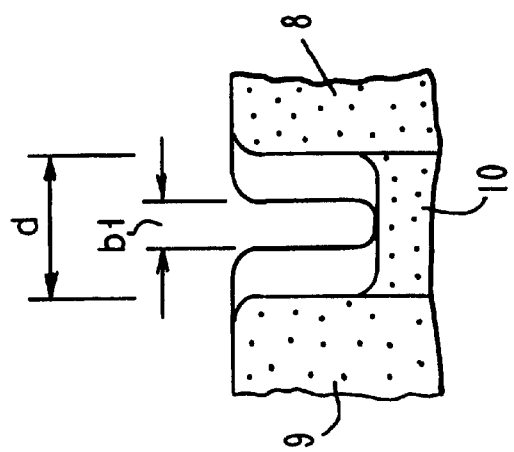
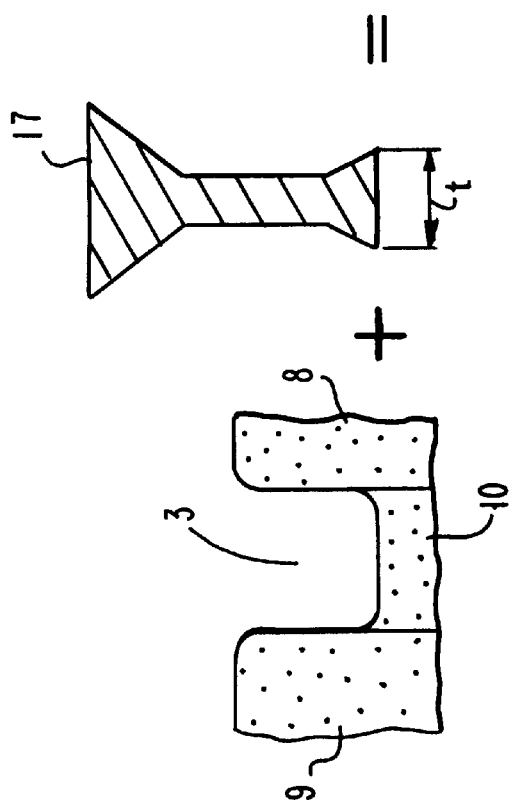
FIG. 5A
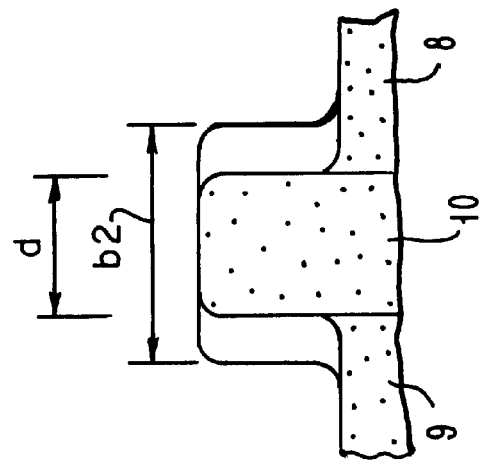
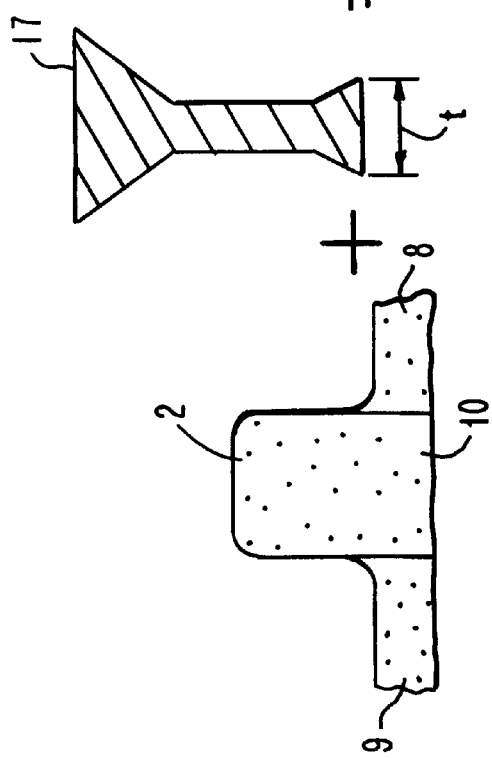
FIG. 5B

CALIBRATION STANDARD FOR 2-D AND 3-D PROFILOMETRY IN THE SUB-NANOMETER RANGE AND METHOD OF PRODUCING IT This is a divisional of application Ser. No. 08/472,100, filed Jun. 7, 1995, now U.S. Pat. No. 5,665,905 which issued Sep. 9, 1997 which is a divisional of application Ser. No. 08/255,209 filed Jun. 7, 1994, now U.S. Pat. No. 5,534,359 which issued Jul. 9, 1996.

FIELD OF THE INVENTION

The present invention relates to a calibration standard for the profilometry in the sub-nanometer range, especially for the Atomic Force Microscope/Scanning Tunneling Microscope (AFM/STM) profilometry and to a method of producing said calibration standard.

BACKGROUND OF THE INVENTION

Nanometrology stands for the measurement technology necessary to investigate, to develop and to verify the measuring features of instruments and of material standards with an uncertainty best given in units of nanometers. For the calibration of different probe systems and different measuring instruments reference standards are asked for.

2-D AFM profilometry uses specially shaped ultrafine silicon tips with a diameter of typically about 250 nm. The absolute measuring preciseness solely depends on the exact knowledge of the tip diameter which usually is determined by a high resolution SEM with a measuring accuracy of 3 to 5%

With a tip diameter of 250 nm this leads to a measuring preciseness worse than about 7.5 nm. Within the electron microscope, depending on the rest gas concentration, the tip is more or less contaminated and thus its diameter is changed indefinitely during measuring. To improve the measuring accuracy the tip should be calibrated directly before and after the measurement with a gauge.

Other common solutions also focus on the application of single-crystal silicon technology.

A standard reference material (SRM) consisting of a silicon wafer with a silicon dioxide film of uniform thickness is described in SPIE Vol. 661, "Film thickness and refractive index Standard Reference Material calibrated by ellipsometry and profilometry" by G. A. Candela et. al. The silicon dioxide film contains windows used for stylus profilometry measurements with a mechanical depth very nearly the same as the oxide thickness. The depth is not exactly the same as the oxide thickness due to native oxide forming in the window with an average thickness of about 2 nm. This affects the accuracy of the measurement In Metrologia, 1991/92, Vol. 28, pp. 443–453, "Nanometrology at the PTB" by H. Kunzmann, a reference scale in the sub-nanometer range is derived from a silicon single crystal epitaxially grown by chemical gas transfer. With high probability the surface of this crystal is plane within one lattice plane and it is proposed to use the steps which are small-integer multiples of lattice plane distances for the calibration of probe systems for nanometrology. These steps are results of the epitaxial processes and they could be used to manufacture step-height gauges, but only if the technology of epitaxial growth could be brought under well-defined metrological control. Although realizing accuracies in the sub-nanometer range, this solution only covers 1-D displacement metrology.

SUMMARY OF THE INVENTION

In accordance with the present invention, a calibration standard and method for calibrating is described comprising a supporting structure of single crystal material with at least one pair of different kinds of structures, the structures including at least a trench and a raised line having substantially the same width.

The invention further provides an array of structures wherein the widths are different between selected structures in said array.

It is therefore an object of the invention to provide a calibration standard for 2-D and 3-D profilometry with an accuracy in the range of 1 nm and better.

The invention also comprises methods of producing a calibration standard and the use of the standard for measuring features in the sub-nanometer range.

BRIEF DESCRIPTION OF THE DRAWING

These and other features, objects, and advantages of the present invention will become apparent upon consideration of the following detailed description of the invention when read in conjunction with the drawing which:

FIG. 1 shows the calibration standard with one pair of different kinds of structures.

FIG. 2a shows an array of pairs.

FIG. 2b shows an array of dies on a wafer.

FIG. 3 shows the calibration standard with one pair of different kinds of structures and the measured profile lines.

FIGS. 5A and 5B show cross-section views of a preferred method of measuring features like ultrafine silicon tips with the calibration standard.

DESCRIPTION OF THE PREFERRED EMBODIMENT

Figure 4A:
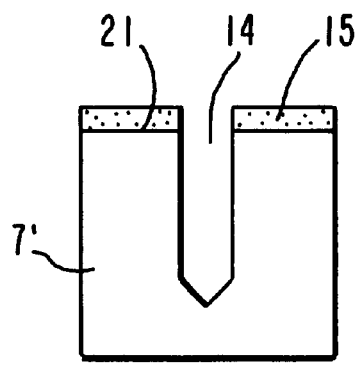
FIGS. 4A–4E show cross-section views of the process steps of a preferred method of producing the calibration standard.
Figure 4B:
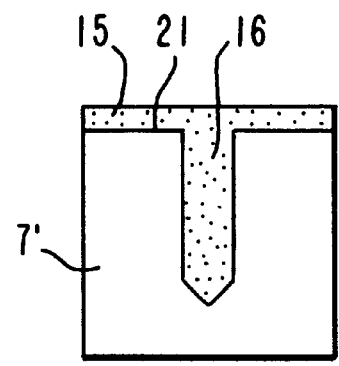

Referring now to the drawing, FIG. 1 shows the basic structure of the calibration standard consisting of a supporting structure 1 and one pair 4 of different kinds of structures 2, 3.

The first kind of structure is a raised line, tablet and the second kind of structure is a or opening 3. Both of the structures, the trench or opening 3, or plate and the trench raised line, tablet or plate 2, are of exactly the same width.

Since this basic structure is used as a calibration standard, the width of these structures 2,3 should be comparable to the lateral and vertical dimensions of the features to be measured. This has the advantage that the calibration as well as the measuring step may be carried out within the same operating area of AFM/STM profilometry.

Nowadays, the smallest lateral dimensions to be measured are the smallest (metal) linewidths of the semiconductor chips, typically in the range of 500 nm (16 Mbit-chip) or of 350 nm (64 Mbit-chip). Typical vertical dimensions are smaller than approximately 2000 nm.

The width of the trench and the raised conductive line as well as their vertical dimension therefore preferably lie in the range from 350 to 2000 nm and may be, for example, approximately 500 nm.

In a preferred embodiment, groups 6 of basic structures or pairs 4 of different kinds of structures 2, 3 of a group 6 having the same width are provided as shown in FIG. 2A. Groups 6 of basic structures or pairs 4 form an array 5 and several arrays 5 of calibration structures may be arranged on a substrate 7, preferably of silicon material.

In the embodiment shown in FIG. 2B, array 5 of groups 6 of basic structures with different line widths are arranged on a relatively small area of a few square millimeters on a silicon wafers typically in a die of about 1 cm$^2$. For calibrating different tips or for calibrating piezoelectric actuators this is very important since it is required to have a calibration standard with structures 2, 3 showing different line widths.

One method to produce a calibration standard as described above starts with providing two polished wafers 8,9 as shown in FIG. 3. These wafers 8, 9 have the same single crystal material with the micro roughness of the polished surfaces 11, 12 respectively being better than 1 nm. The preferred material is silicon Both wafers 8, 9 have the same crystal orientation with respect to its surface 11, 12. For the method described hereinafter their surface 11, 12 is a (110)-surface. On the polished surface 11 of the first wafer 8 an oxide 10 is grown by thermally oxidizing the wafer 8 until an oxide thickness corresponding to the width of the raised line 2 and the trench 3, which are to be formed later, is reached. The thickness of the oxide layer 10 thus lies in the range from 350 to 2000 and may be, for example, approximately 500 nm. In a next step the second wafer 9 is bonded to the oxide layer 10 grown on the first wafer 8. This is done in a way that the polished surfaces 11, 12 of both the wafers 8, 9 are facing each other.

In the following steps, especially when the structures 2, 3 of the calibration standard will be formed, this detail becomes important since the polished surfaces 11, 12 will form the walls of the trench 3. The bonding step typically is fusion bonding or anodic bonding of the two wafers 8, 9 and produces a chemical interconnection between the two wafers at the interface 12.

The bonded sandwich structure thus achieved is then cut transverse, for example, orthogonal (rectangular) to the polished surfaces 11, 12 of the bonded wafers 8, 9 by a sawing step and the surface of cut 13 is polished and cleaned in a known manner.

Breaking of the sandwich structure is not appropriate since this often causes unwanted micro cracks at the interface 12.

In this preferred embodiment the surface of cut 13 is a (111)-surface due to the use of wafers 8, 9 with (110)-wafer surfaces.

By embedding the silicon dioxide layer 10 between the polished surfaces 11, 12 of the wafers, damage of the silicon dioxide layer 10 is avoided during polishing. By depositing a thin film onto the oxide layer 10 instead of bonding a wafer 9, subsequent damage of the oxide film 10 would occur when the surface of cut 13 is polished.

As a next step, the wafer material 8, 9 embedding the oxide layer 10 is selectively etched back from cut 13 to a defined depth of about 500 nm. To avoid sidewall contamination of the raised line 2 to be formed and to achieve a high selectivity of at best 1000:1 between the wafer material, preferably a semiconductor such as silicon, and the oxide layer 10, silicon dioxide, anisotropical wet etching is chosen instead of plasma etching. Isotropical wet etch solutions normally show poorer selectivity of about a factor 10.

With a caesium hydroxide anisotropical wet etch solution a selectivity of about 800:1 may be expected. Although when etching with the desired selectivity of 1000:1 the upper edges of the raised line 2 will be shrunk of approximately 0.5 nm. This effect, however, is reproducible and does not affect the use of the calibration standard for measuring features.

Now the calibration standard shows a raised silicon dioxide line 2 over its entire length.

Next, portions of the raised line 2 are masked with an etch protecting layer of, for example, silicon nitride. In the unmasked areas the oxide layer 10 is etched to a defined depth of about 500 nm in a wet etch solution. A suitable etch solution is buffered hyro fluoric (BHF) acid showing an extremely high etch selectivity between the silicon dioxide layer 10 and the silicon of the embedding wafers 8, 9.

The trench 3 thus produced has sidewalls being ideally planar and parallel to one another with a micro roughness of less than 1 nm.

After etching to form trench 3, native oxide will grow on the silicon sidewalls of trench 3 thus narrowing it by approximately 1 nm. Since this narrowing is constant along the whole length of trench 3 and since it is reproducible, it does not disturb the measuring of features with the calibration standard.

Another possibility of producing the calibration standard is shown with its different process steps in FIGS. 4A to 4E.

The base material is a one-side polished wafer 7' of single crystal material with a (110) orientation of its surfaces preferably silicon. In FIG. 4A a layer 15 of silicon dioxide is deposited on surface 21 of wafer 7' and a pattern is exposed in a photoresist and transferred by dry or wet etching into the silicon dioxide layer 15. The edges of the pattern have to be aligned extremely precise parallel to (111) planes of the wafer 7. The pattern is anisotropically etched into surface 21 of the wafer by preferably KOH. The pattern comprises a pattern of trenches with different widths with the trenches being arranged in several groups and arrays.

The trenches 14 thus created are confined by (111) planes with two of the (111) planes being parallel and vertical with respect to surface 21 of wafer 7'.

After removal of the residual silicon dioxide mask, the trenches 14 are filled by material 16 which exhibits extremely high etching selectivities compared to the single crystal material. Materials which can be used are thermal or chemical vapor deposited silicon dioxide and silicon nitride.

Figure 4C:
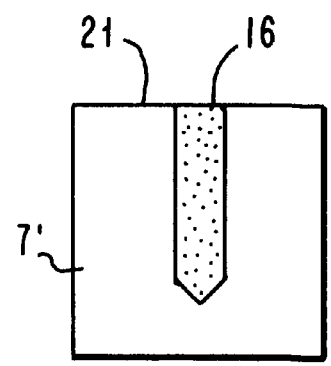

The material 15 on top of the wafer 7' is then etched, polished or chemically and mechanically polished back to the original wafer surface 21 as to be seen in FIG. 4C.

Figure 4D:
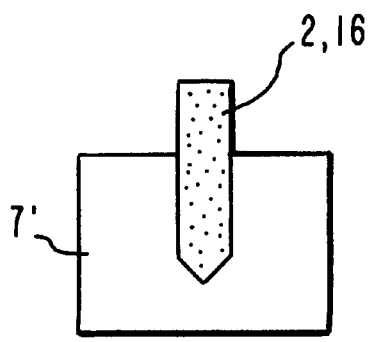
Figure 4E:
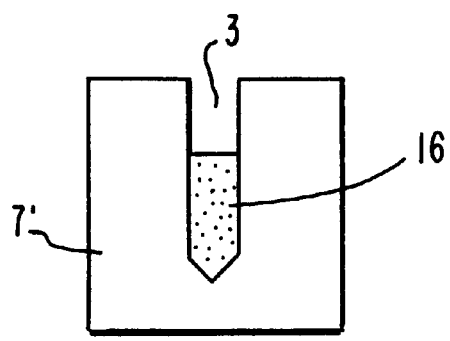

The single crystal wafer material 7' is then selectively etched back against the trench filling material 16 to a defined depth as shown in FIG. 4D. Now a masking process is used to protect a portion or half of each row of rectangular structures 2 with a masking material. In the other unprotected portion or half, the trench filling material 16 is selectively etched back against the single crystal material 7' to a defined depth to create trenches 3 as may be seen in FIG. 4E.

The masking material is selectively removed and the wafer 7' is diced into dies, each die containing now a multitude of calibration structures of different widths as shown in FIGS. 2A and 2B.

In FIGS. 5A and 5B, there is shown a preferred method of measuring features in the sub-nanometer range such as ultrafine silicon tip 17 with the calibration standard. Silicon tip 17 may have cylindrical and conic portions to provide circular cross sections when taken along the z axis.

To determine the width of an ultrafine tip 17 only two measurements are carried out. First the width of a trench 3 is measured by profiling the trench 3 with the tip 17 along a path shown as dashed line 19 in FIG. 3 providing a value b1.

Second the width of a raised line 2 of the same pair 4 of structures 2, 3 is measured by profiling the raised line 2 with the same tip 17 along a path shown as dashed line 18 in FIG. 3 providing a value b2.

To calculate the exact diameter or width of tip 17, the measured values b1 and b2 are subtracted from each other and the resulting value is divided into equal halves according to the formula $$t = \frac{b2 - b1}{2}$$

with t being the diameter of the tip 17.

The lateral dimension d of the raised line 2 and the trench 3 shown in FIG. 3 then is given by $$d = b2 - \frac{b2 - b1}{2}$$

This shows that the knowledge of the exact dimensions of the pair 4 of structures 2, 3 of the calibration standard is not necessary to determine the width of a feature like an ultrafine tip 17 to be measured. It is very important that both of the structures 2, 3, the raised line and the trench, show exactly the identical width and the two measurements needed are carried out with the different structures of the same pair of structures to assure the accuracy of the calibration.

The accuracy strongly depends on the differences in the lateral dimensions, the parallelity of the sidewalls as well as on the micro roughness of the sidewalls between the two different kinds of structures 2, 3.

Therefore, it is important to find optimized production processes to assure that the afforded quality of the parameters is met. Suitable production methods are those described above.

Figure 6A:
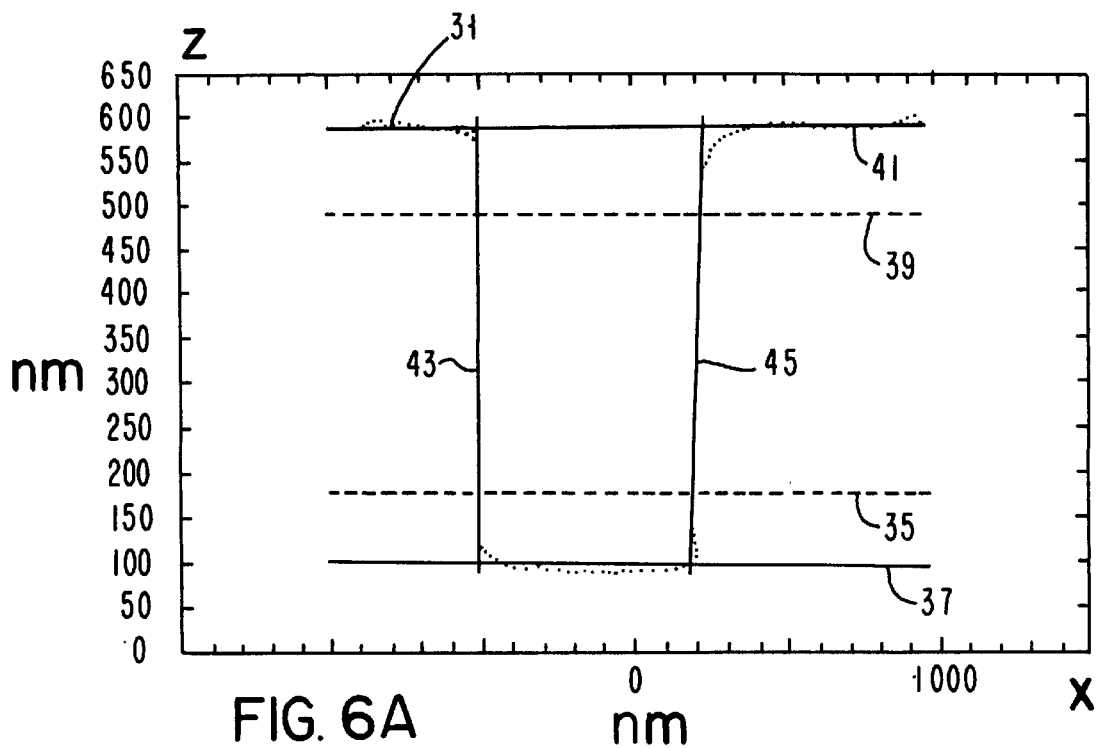
FIGS. 6A–6D show some results of measurements made with an ultrafine tip and the calibration standard.
Figure 6B:
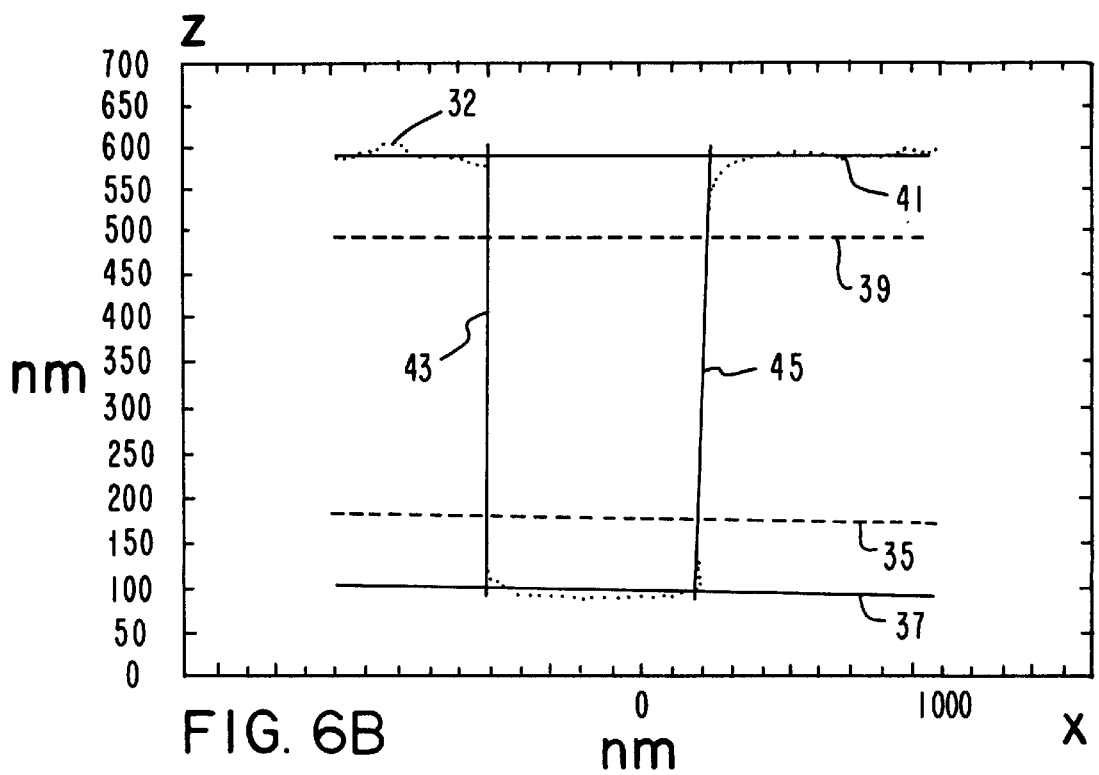
Figure 6C:
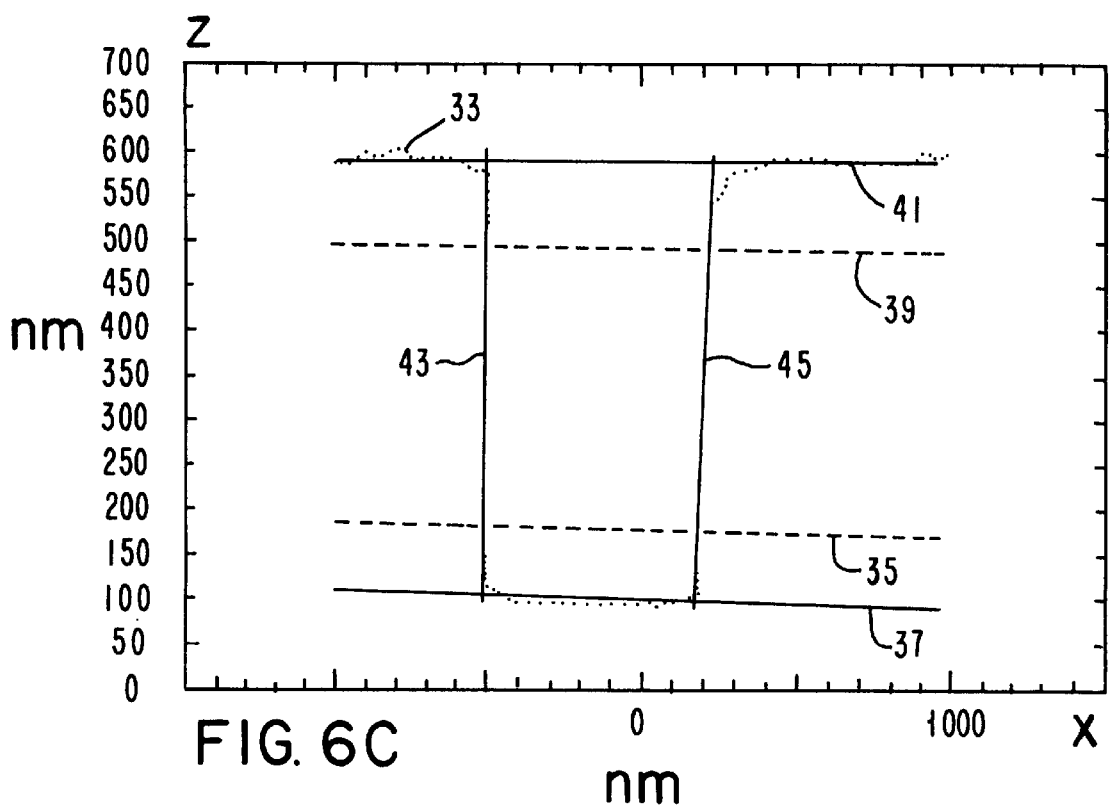
Figure 6D:
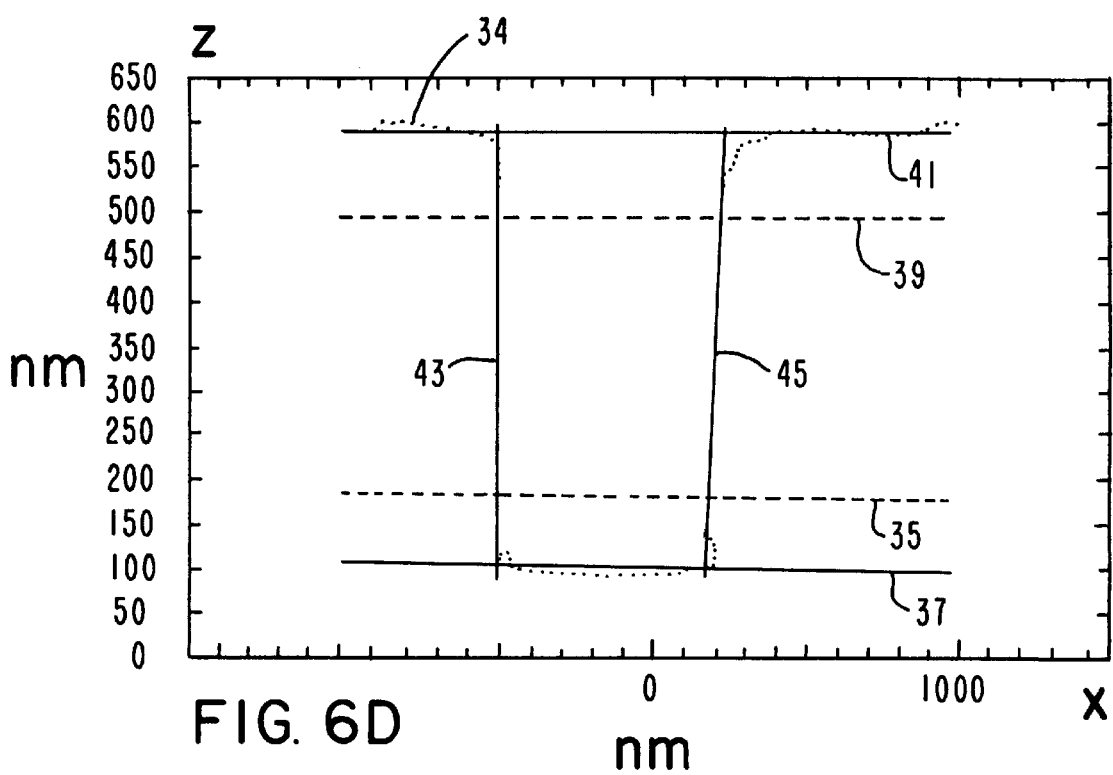

Some results of measurements made with an ultrafine tip and the calibration standard are shown in FIGS. 6A–6D proving the accurateness of this measurement technique. FIGS. 6A–6D shows the repeatability of measurements made in a 716 nm wide trench. In FIGS. 6A–6B the ordinate represents distance in nanometers along the z axis shown in FIG. 3 and the abscissa represents distance in nanometers along the x axis shown in FIG. 3. In FIGS. 6A–6D dotted curves 31–34 show the actual measurements made with an ultrafine tip. Reference line 35 is above the bottom of trench 3 shown by line 37 for measuring trench width at the bottom. Reference line 39 is below the top of trench 3 shown by line 41 for measuring the trench width at the top. Lines 43 and 45 represent the side walls of trench 3.

These measurements demonstrate a repeatability of about 1 nm.

While there has been described and illustrated a calibration standard for ultra fine tips for AFM/STM profilometry comprising a raised line and a trench of substantially the same width and the method making such structures, it will be apparent to those skilled in the art that modifications and variations are possible by without deviating from the broad scope of the invention which shall be limited solely by the scope of the claims appended hereto.

Having thus described our invention, what we claim as new and desire to secure by letters patent is:

1. A method of producing a calibration standard comprising the steps of:

providing a first polished wafer (8) and a second polished wafer (9), said first polished wafer and said second polished wafer having the same single crystal material with the same crystal orientation, forming an oxide layer (10) of a selected thickness on a first polished surface (11) of said first polished wafer (8), bonding said second polished wafer (9) to said oxide layer on said first polished wafer (8) to form a bonded structure with said first polished surface (11) of said first polished wafer (8) facing a second polished surface (12) of said second polished wafer (9), and forming at least one pair (4) of different kinds of structures (2, 3) of identical width with and within said oxide layer (10), said at least one pair (4) of different kinds of structures (2, 3) including a raised line (2) and a trench (3).

2. The method of claim 1 wherein said step of forming said at least one pair (4) of different kinds of structures (2, 3) further includes the steps of:

cutting said bonded structure transverse to said first polished surface (11) and said second polished surface (12), polishing a surface formed by said step of cutting, selectively etching said first and second polished wafers (8, 9) to a first depth, masking the portions of said oxide layer (10) now representing a first kind of structure (2), and selectively etching said oxide layer (10) in the unmasked areas to a second depth.

3. The method of claim 1 wherein said step of forming said oxide layer (10) includes the step of thermally oxidizing said first polished wafer (8) and wherein said step of bonding includes the step of bonding selected from the group consisting of fusion bonding and anodic bonding.

4. The method of claim 2 wherein said step of selectively etching said first polished wafer (8) and said second polished wafer (9) includes the step of anisotropically wet etching and said step of selectively etching said oxide layer (10) includes the step of etching with buffered hydrofluoric acid (BHF).

* * * * *